UNITED STATES PATENT OFFICE.

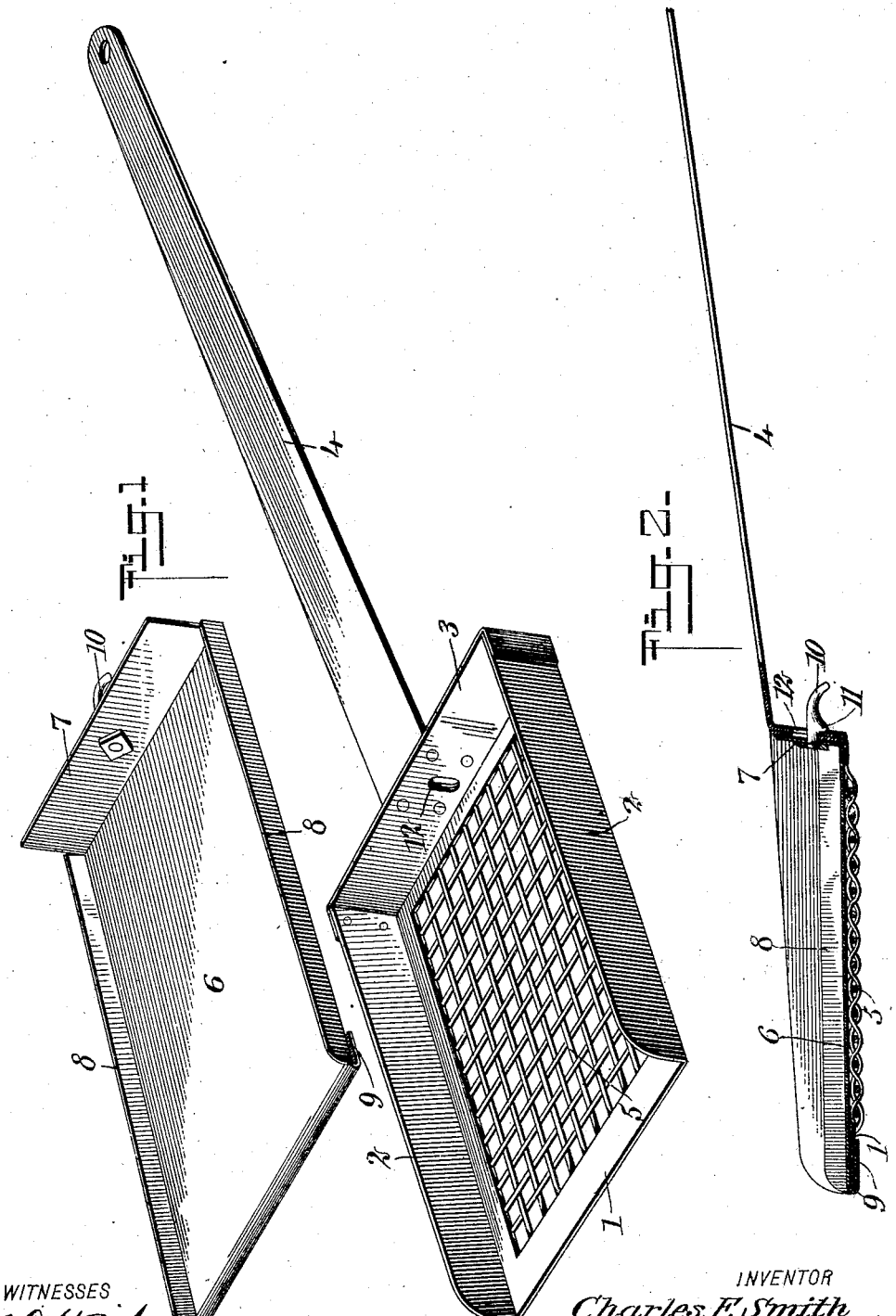

CHARLES FRANKLIN SMITH, OF NEW YORK, N. Y.

SHOVEL.

No. 842,032.  Specification of Letters Patent.  Patented Jan. 22, 1907.

Application filed November 17, 1906. Serial No. 343,849.

*To all whom it may concern:*

Be it known that I, CHARLES FRANKLIN SMITH, a citizen of the United States, and a resident of the city of New York, borough of Brooklyn, county of Kings, and State of New York, have invented a new and Improved Shovel, of which the following is a full, clear, and exact description.

This invention is an improvement in shovels of the coal-shovel type, embodying in a single device an implement of this character and one for sifting ashes, especially before the same are removed from the stove.

The invention is particularly directed to an improved form of detachable bottom for the shovel and a novel device for securing the same in place, said device being of such construction and placed in such position as not to interfere with the use of the shovel in the ordinary manner.

Reference is to be had to the accompanying drawings, forming a part of this specification, in which similar characters of reference indicate corresponding parts in both the figures.

Figure 1 is a perspective view of my improved shovel and the detachable bottom disassembled, and Fig. 2 is a longitudinal central section through the shovel with the bottom thereof secured in position.

The invention consists of an ordinary form of coal-shovel comprising a blade 1, sides 2, and an end piece 3, connecting the sides together, said end piece being provided with a handle 4, secured thereto by rivets or other suitable devices. The blade 1 is provided with a rectangular or other form of opening, in which is secured a screen 5 of wire-mesh and of such coarseness as employed in an ordinary type of ash-sifter.

A removable member or bottom 6 is constructed with an upwardly-turned end 7 and sides 8 of a size and shape to closely fit the sides 2 and end 3 when the bottom is inserted in the shovel. The forward end of the bottom is bent upon itself, as at 9, to form a pocket to embrace the blade 1 at its outer end, and thereby hold this part of the bottom and blade in close engagement. The end 7 of the bottom 6 has secured to it a finger 10, projecting outwardly and preferably constructed with a curved under face, as shown, with a projection 11 near the inner end thereof for engaging at the outside of the end 3 of the shovel when the bottom and shovel are assembled. An opening 12 of oblong form is cut through the center of the end 3 to receive the finger 10 when the bottom is placed in position.

To remove the bottom 6, as when desired to sift ashes when in the stove, it is only necessary to pass the finger underneath the part 10, while the hand still grasps the handle 4 of the shovel, and pull said part 10 upwardly, releasing the projection 11 and admitting of the bottom to be withdrawn. After the ashes are separated from the cinders the ashes are removed by reassembling the shovel proper and the bottom, as indicated in Fig. 2.

Having thus described my invention, I claim as new and desire to secure by Letters Patent—

1. A shovel having a screen-blade, a member for covering said blade having one end bent upon itself to embrace the forward edge of the blade, and a device passing through the rear end of the shovel for detachably securing said blade in place.

2. A shovel having a screen-blade, a bottom for covering said blade having one end bent upon itself to form a pocket embracing the forward edge of the blade, said bottom having its rear end upwardly turned, and means carried by said upwardly-turned end for detachably securing the bottom in place.

3. A shovel comprising a blade having a cut-out portion therein, a screen in said cut-out portion, a bottom for covering said blade having an upwardly-turned rear end with the opposite and forward end bent upon itself to form a pocket adapted to inclose and embrace the forward end of the blade, and a finger secured to the upwardly-turned end of the bottom having a curved under face with a projection at one end thereof adapted to be passed through the rear end of the shovel and engage the same, detachably securing the bottom in place.

In testimony whereof I have signed my name to this specification in the presence of two subscribing witnesses.

CHARLES FRANKLIN SMITH.

Witnesses:
ARTHUR STUBER,
ROBERT HARPER.